W. H. WASHBURNE.
VALVE.
APPLICATION FILED MAY 14, 1919.

1,338,759. Patented May 4, 1920.

Witness:
Harry S. Gaither

Inventor:
William H. Washburne
by Chamberlin & Freudenreich
Attys

UNITED STATES PATENT OFFICE.

WILLIAM H. WASHBURNE, OF CHICAGO, ILLINOIS, ASSIGNOR TO SELF SEATING VALVE COMPANY, OF CHICAGO, ILLINOIS, A CORPORATION OF ILLINOIS.

VALVE.

1,338,759.

Specification of Letters Patent.  Patented May 4, 1920.

Application filed May 14, 1919.  Serial No. 297,063.

*To all whom it may concern:*

Be it known that I, WILLIAM H. WASHBURNE, a citizen of the United States, residing at Chicago, county of Cook, State of Illinois, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates particularly to frusto-conical valves of the laminated type and has for its object to improve the construction of the same.

The purpose in making frusto-conical valves laminated is to cushion them against blows, make them seat tightly, regardless of slight irregularities in the contacting surfaces, and produce more or less of a scraping action between the contacting surfaces tending to keep them clean. In attempting to secure these qualities in valves there has always been, so far as I am aware, too much flexibility or the wrong kind of flexibility, thereby defeating the intended purpose through a spreading or separation of the laminæ at the edges and permitting the entrance of flame, hot gases, and solid foreign matter.

Specifically considered, the present invention has for its object to produce a laminated frusto-conical valve which shall possess the requisite flexibility to give to it the desired cushioning, seating and cleaning capacity, without being of such a construction that the laminæ will spread apart at the edges so as to admit the entry of solid foreign matter or of hot gases which will act to draw the temper.

Figure 1:
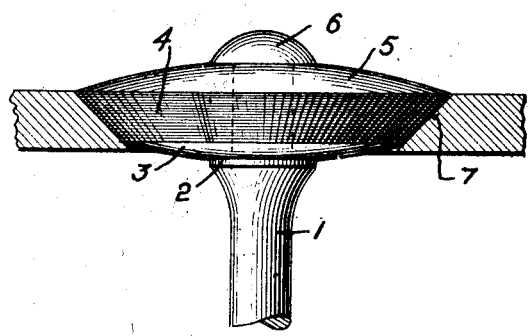
Figure 2:
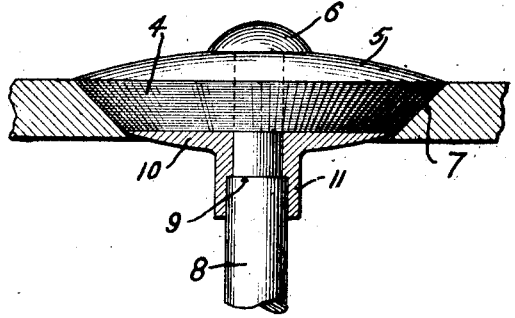

The various features of novelty whereby my invention is characterized will hereinafter be pointed out with particularity in the claim; but, for a full understanding of my invention and of its objects and advantages, reference may be had to the following detailed description taken in connection with the accompanying drawing, wherein:

Figure 1 is a side elevation of a valve arranged in accordance with the preferred form of my invention, the member having the coöperating valve seat being shown in section; and Fig. 2 is a view similar to Fig. 1, illustrating a modification, a portion of the valve in Fig. 2 being in section.

Referring to Fig. 1 of the drawing, 1 represents a valve stem having a short distance from one end a shoulder, 2, directed toward that end. On the shoulder rests a plate, 3, in the form of a washer which is thick at the center and at the margin tapers gradually to a thickness approximating that of the individual laminæ, 4, of which the body of the valve is composed. The laminæ are in the form of thin washer-like disks of extra hard steel lying upon the member 3 and clamped tightly down upon the same by means of a top plate, 5, larger than the plate 3 but similar thereto in that it is made thick at the center and at the margin tapers gradually to a thickness corresponding approximately to that of the individual laminæ. The plate is held in place by means of a suitable part, 6, on the end of the valve stem; this part taking any usual or suitable form, preferably being simply a head formed by riveting the end of the stem, since the construction of the valve is such that there is no necessity for taking it apart after it has once been assembled. The face of the valve is finished so that it takes the form of a frustum of a cone the extreme circular elements at the ends of which are the edges of the clamping plates. When the valve is fitted to its seat, indicated at 7, not only the laminæ but also the edges of the clamping plates engage with the seat.

It will thus be seen that the valve has a slight marginal flexibility very similar to that which would be possessed by a solid body of flexible material. This results from the expansion of the clamping plates into the actual valve face and the gradual tapering of the marginal portions of the clamping plates so as to avoid an abrupt transition from a point of substantially complete rigidity to one of complete flexibility along any radius. The valve will therefore yield sufficiently to secure the desired results without leaving any possibility of a fan-like spreading of the laminæ, to a greater or lesser degree, which will permit the entrance of carbon or of flame which quickly draws the temper of the laminæ in valves where such spreading takes place.

In the arrangement shown in Fig. 2 the parts are the same as those heretofore described except that the stem, 8, has a shoulder, 9, which is formed simply by reducing the diameter of the end of the stem, and the plate, 10, which corresponds to the plate 3 is provided with a skirt or flange, 11, closely fitting the stem below the shoulder.

While I have illustrated and described only a single preferred form of my invention with a single slight modification, I do not desire to be limited to the exact structural details thus illustrated and described; but intend to cover all forms and arrangements which come within the terms employed in the definitions of my invention constituting the appended claim.

I claim:

A frusto-conical valve comprising a body of thin flexible disks lying upon each other, stiff end plates one lying above and the other below said disks, and means for clamping said end plates and disks together, each of said plates being of approximately the same diameter as the adjacent disk, and each of the plates having a marginal portion reduced in thickness to approximately the thickness of one of the disks.

In testimony whereof, I sign this specification.

WILLIAM H. WASHBURNE.